United States Patent [19]
Shier

[11] Patent Number: 5,488,518
[45] Date of Patent: Jan. 30, 1996

[54] PROGRAMMABLE PRE-AMPLIFIER USING A SERIAL SHIFT REGISTER TO OUTPUT A PLURALITY OF CONTROL SIGNALS

[75] Inventor: John S. Shier, Apple Valley, Minn.

[73] Assignee: VTC Inc., Bloomington, Minn.

[21] Appl. No.: 290,479

[22] Filed: Aug. 15, 1994

[51] Int. Cl.$^6$ ............................. G11B 5/02; G11B 5/09
[52] U.S. Cl. .................................. 360/67; 360/46
[58] Field of Search ...................... 360/46, 67, 68, 360/61, 62; 330/86

[56] References Cited

U.S. PATENT DOCUMENTS

| | | | |
|---|---|---|---|
| 3,723,894 | 3/1973 | Benenati | 330/29 |
| 4,091,380 | 5/1978 | Yu | 340/347 DD |
| 4,535,371 | 8/1985 | Harr et al. | 360/46 |
| 4,542,349 | 9/1985 | Hoeft | 330/279 |
| 4,551,685 | 11/1985 | Kerns, Jr. et al. | 330/86 |
| 4,739,307 | 4/1988 | Marcovici et al. | 340/347 AD |
| 4,918,397 | 4/1990 | Kidger | 330/86 |
| 5,034,699 | 7/1991 | Powell | 330/86 |
| 5,157,559 | 10/1992 | Gleason et al. | 360/46 |
| 5,321,559 | 6/1994 | Nguyen et al. | 360/46 |

*Primary Examiner*—Andrew L. Sniezek
*Assistant Examiner*—W. Chris Kim
*Attorney, Agent, or Firm*—Kinney & Lange

[57] ABSTRACT

A data storage system for storing and retrieving data signals on magnetic medium includes a magnetic transducer, a controller for issuing instructions, and a pre-amplifier adaptive to data storage parameters. The pre-amplifier includes a read amplifier having an adjustable gain, a write driver having an adjustable current source, and a serial shift register responsive to the instructions to selectively operate the read amplifier and the write driver and to issue control signals to first and second digital-to-analog converters to adjust the gain of the read amplifier and the current source of the write driver. Preferably first and second multiplexers are responsive to the control signals to select one of a plurality of magnetic transducers.

3 Claims, 2 Drawing Sheets

PROGRAMMABLE PRE-AMPLIFIER USING A SERIAL SHIFT REGISTER TO OUTPUT A PLURALITY OF CONTROL SIGNALS

BACKGROUND OF THE INVENTION

The present invention relates to pre-amplifier circuits. More particularly, the present invention relates to a programmable read/write pre-amplifier circuit used in a data storage system having at least one magnetic disc.

Magnetic disc drives have read/write heads which are used for both writing data to a magnetic disc and reading data from the magnetic disc. During a write operation, a write signal is provided to a selected read/write head from a write control circuit. The write signal represents data to be encoded onto the magnetic disc. More particularly, the read/write head receives encoded digital data from a "channel" chip. The transitions of the signal received from the channel chip cause the write current flowing within the read/write head to reverse direction which, in turn, induces a flux reversal in the magnetized material of the medium.

During a read operation, the read/write head senses flux reversals from the magnetic disc. The flux reversals are encoded onto the magnetic disc during the write operation. Based on the flux reversals, the read/write head provides a read signal to a read circuit. The read circuit amplifies the read signal and a channel circuit recovers the data. The channel circuit then provides the data to a magnetic disc controller for further processing.

In certain types of magnetic recording, digital information is recorded at different frequencies, depending upon the position of a concentric track of a disc. For example, employing a technique called "zone-bit recording", information on different tracks is recorded at different frequencies. By using different recording frequencies at the inner and outer disc tracks, the physical spacing between flux reversals can be nearly the same throughout the surface of the magnetic disc.

However, in the recovery of signals from such magnetic discs, it is necessary to employ read pre-amplifier circuits which are capable of receiving and detecting the frequency of the data encoded on the magnetic media. The frequency varies from track to track by as much as two times over the radius of the disc.

Conventional data storage/retrieval systems require individualized read/write pre-amplifier circuits which are fabricated to accommodate the particular recording and retrieval frequencies associated with a specific disc drive. The read/write pre-amplifier circuit (i.e."pre-amplifier chip") interacts with the host computer through a controller. Although the controller performs various tasks, only a small minority of the controller functions affect the read/write pre-amplifier circuit.

More particularly, there are three principal control signals which pass between the controller and the pre-amplifier circuit. The first control signal determines the mode (i.e. read or write) of the pre-amplifier circuit. In the read mode, the pre-amplifier acts as a high gain, low noise linear amplifier to boost the peak-to-peak read signal. In the write mode, the pre-amplifier receives encoded digital data from the channel chip for recording on the disc.

With the second control signal, the controller determines the "chip enable" status of the read/write pre-amplifier. In other words, when the chip enable function is low, the pre-amplifier can be in either read or write mode, as determined by the controller. However, if chip enable is high, the chip is placed in an "idle" state. In an idle state, the read/write pre-amplifier is neither reading nor writing. Ideally, the pre-amplifier chip should consume the least amount of power when in the idle state.

The third control signal delivered from the controller to the read/write pre-amplifier circuit is the head select signal. Each disc in the drive stack has a "head" adjacent the top and bottom surfaces. Thus, there are 2N heads per stack, where N is the number of discs in the stack, but only one head is active at a given time. A binary coded head select signal chooses which head is selected. In conventional disc drive systems, there may be one to five head select signals, depending upon how many heads the particular pre-amplifier circuit is designed to serve.

Conventional systems require each disc drive to be fabricated with off-chip circuitry, which usually consists of passive elements such as resistors, connected to the read/write pre-amplifier circuit. The off-chip circuitry allows the systems to accommodate specific data characteristics of a particular disc drive and specifically, to accommodate the particular head and a given zone. Pre-amplifier circuits which could adapt to any type of disc drive would be a valuable contribution to the art.

SUMMARY OF THE INVENTION

By the present invention, signals from the controller are routed directly to the pre-amplifier circuit in a disc drive to automatically adjust the pre-amplifier circuit to adapt to the specific set of features associated with a particular disc drive and to the characteristics of a particular head and a given zone.

More particularly, the pre-amplifier circuit includes a read amplifier circuit and a write driver circuit. The read amplifier circuit includes one or more digital-to-analog converters with inputs connected to a serial register. The serial register is in direct communication with the controller so that control signals including chip enable, read/write mode and head select may be provided to the read amplifier circuit in this serial manner without significantly increasing the number of pins for the pre-amplifier circuit. Correspondingly, the write driver circuit includes a digital-to-analog converter connected to the serial register. The serial register used in the write driver circuit is the same as that in the read amplifier circuit and thus also communicates directly with the controller so that write characteristics, such as the magnitude of the write current may be fed directly to the write driver circuit without using excess pins or chip area.

DETAILED DESCRIPTION OF THE PREFERRED EMBODIMENTS

Figure 1:
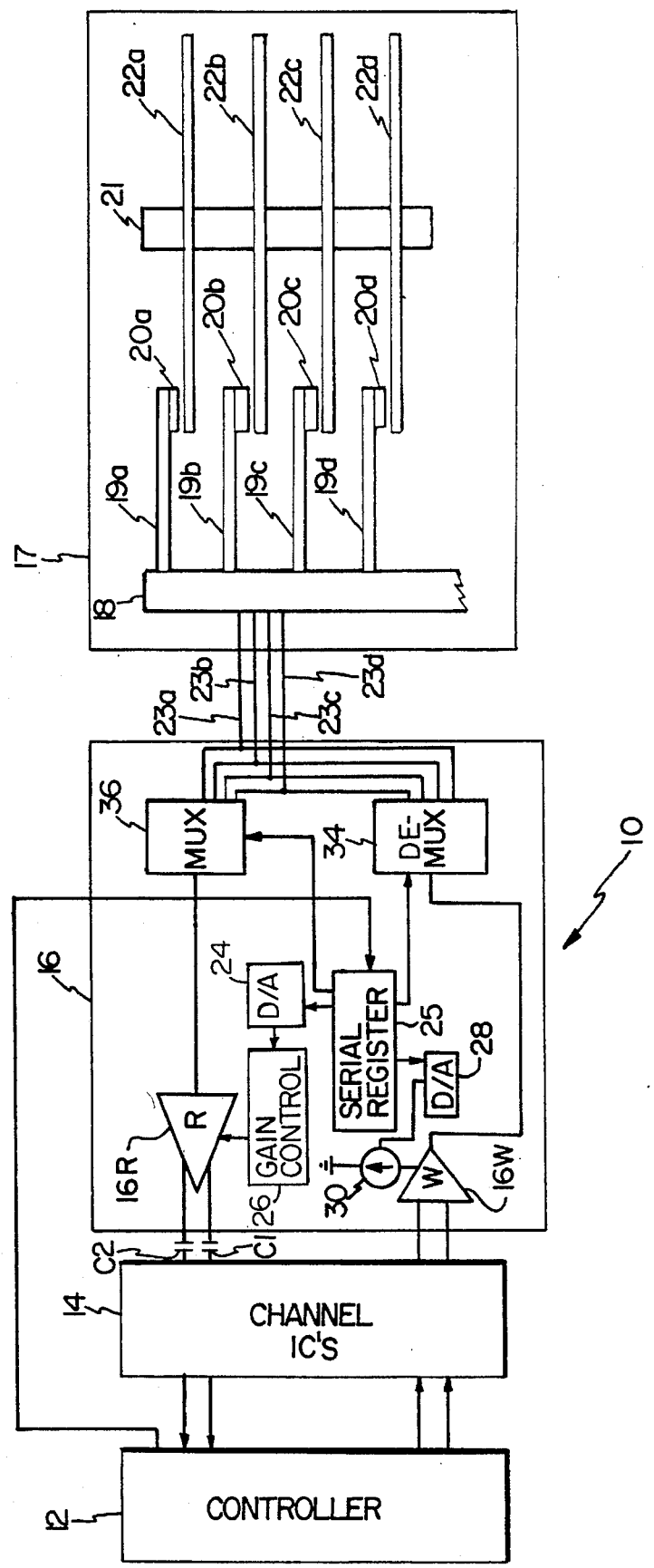
FIG. 1 is a block diagram showing a portion of a disc drive.

FIG. 1 illustrates system 10 having a programmable pre-amplifier according to the present invention in conjunction with a conventional "peak detection" disc drive. System 10 includes a conventional controller 12, conventional channel ICs 14, pre-amplifier circuit 16 according to the present invention, and a conventional disc storage system 17. Controller 12 is connected to channel ICs 14 and also directly to pre-amplifier circuit 16. Pre-amplifier circuit 16 is then connected between channel ICs 14 and disc storage system 17.

Disc storage system 17 generally comprises a spindle and servo system. Support arms 19a–19d are connected to actuator 18. Heads 20a–20d are attached on the ends of support arms 19a–14 19d. Magnetic discs 22a–22d rotate adjacent heads 20a–20d supported by spindle 21.

A person skilled in the art will recognize that disc storage system 17 is shown in a simplified representation, not showing all elements typically used. Typically, magnetic discs will have support arms supporting heads on both top and bottom surfaces of the magnetic discs, but for clarity of explanation only the upper surface heads are shown. Also, the number of magnetic discs does not need to be limited to four and is typically more. A person skilled in the art will recognize that typical systems will have at least twice as many heads as shown in FIG. 1, one for each disc surface.

In disc storage system 17, magnetic discs 22a–22d rotate on spindle 21 proximate to heads 20a–20d. Data are written to, and read from, the magnetic discs through the corresponding heads. For example, head 20a reads data from, and writes data to, magnetic disc 22a, head 20b reads data from, and writes data to, magnetic disc 22b, head 20c reads data from, and writes data to, magnetic disc 22c, and head 20d reads data from, and writes data to, magnetic disc 22d.

Connections 23a–23d are attached between pre-amplifier circuit 16 and actuator 18 of disc storage system 17. In this way, one connection line exists for each head in disc storage system 17. Thus, for example, if magnetic disc 22b is selected for use, then connection 23b will transmit the encoded data to or from magnetic disc 22b through head 20b. A person skilled in the art will recognize that more connections will be necessary in a typical system. Since the actual number of heads will be at least twice as many as shown, at least twice as many connections will be used. Again, however, for clarity of explanation, only four heads with four corresponding connections are shown.

Pre-amplifier circuit 16 is a single chip bi-directional unit which includes read amplifier circuit 16R and write driver circuit 16W, serial register 25, converters 24 and 28, voltage gain control 26, current source 30, and multiplexers 34 and 36.

Serial register 25, of both read amplifier circuit 16R and write driver circuit 16W in pre-amplifier 16, receives control signals directly from controller 12. These signals include a chip enable signal, a read/write mode signal and a head select signal. The chip enable signal designates the mode of pre-amplifier 16 as enabled or disabled so that pre-amplifier 16 will be active only during reading or writing operations. The read/write mode signal designates the mode of pre-amplifier 16 as either read or write. Finally, the head select signal designates which head, from the plurality of heads, that will be read from or written to.

The input for read amplifier circuit 16R is the encoded data from magnetic discs 22a–22d which is read by heads 20a–20d and passed through multiplexer 36. The output of read pre-amplifier circuit 16R is controlled by digital-to-analog converter 24, voltage gain control 26 and serial register 25 in accordance with the present invention. More particularly, digital-to-analog converter 24 and voltage gain control 26, through serial register 25, translate instructions from controller 12 which enhance the read signal before it passes through coupling capacitors $C_1$ and $C_2$ to enter the "read channel" (not shown) within the channel ICs 14.

The input for write driver circuit 16W comes from circuitry within channel ICs 14. With the invention, signals from controller 12 are translated by serial register 25, which in turn operates digital-to-analog converter 28 and current source 30 to alter the magnitude of the write current for write driver circuit 16W. The output of write driver circuit 16W passes through multiplexer 34 to heads 20a–20d which write on magnetic discs 22a–22d. One of the signals from controller 12 is a clock signal. This clock signal controls data entry to serial register 25, to alter the magnitude of the write current entering pre-amplifier circuit 16W so that data may be written onto magnetic discs 22a–22d such that a maximum amount of disc space is utilized.

Figure 2:
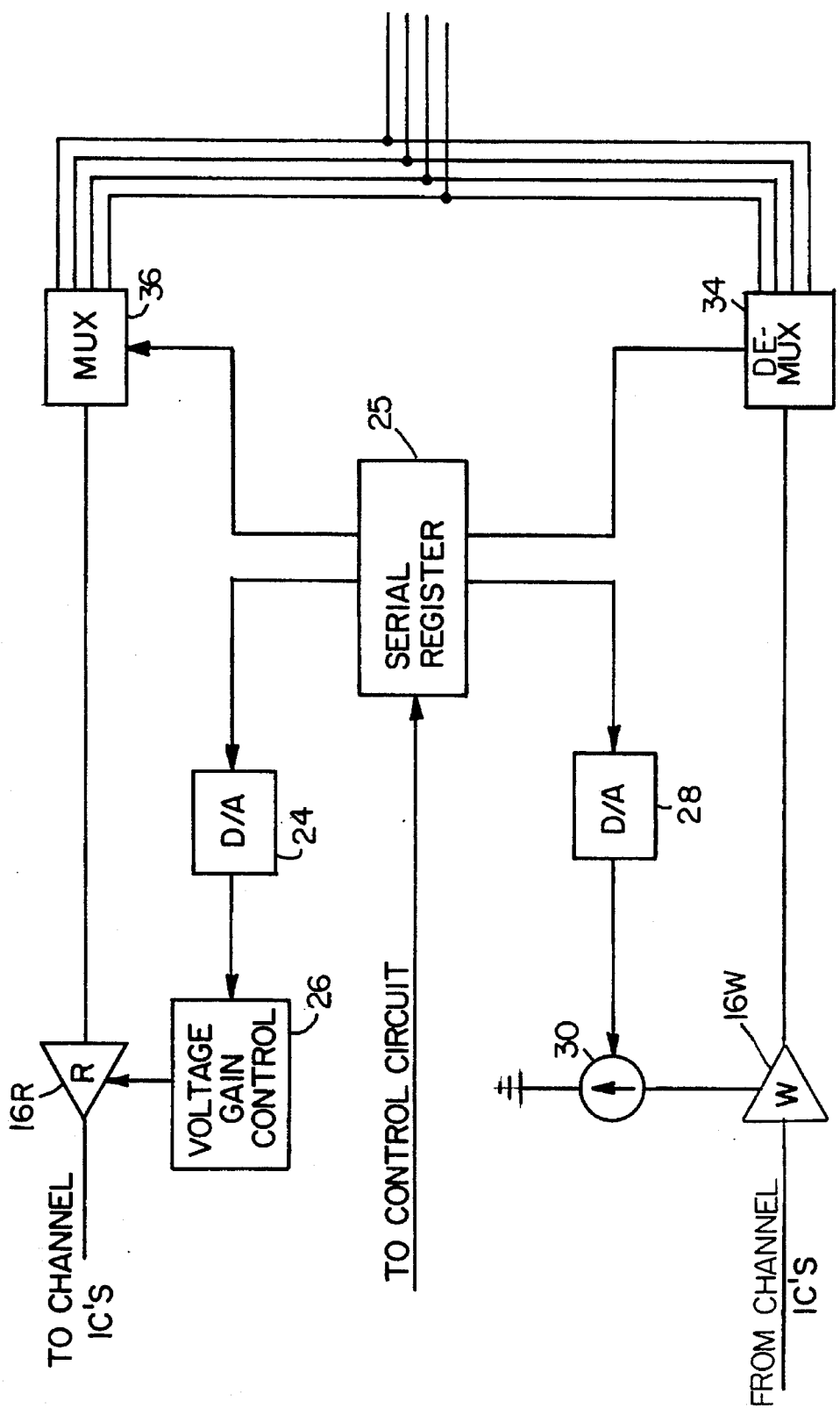
FIG. 2 is an enlarged view of the read/write pre-amplifier circuit shown in FIG. 1.

FIG. 2 shows an enlarged view of pre-amplifier circuit 16 including multiplexer 36, read amplifier circuit 16R, voltage gain control 26, digital-to-analog converter 24, serial register 25, digital-to-analog converter 28, current source 30, write driver circuit 16W, and multiplexer 34 as shown in FIG. 1.

In operation, control signals containing information regarding the mode of pre-amplifier circuit 16 (i.e., either read or write), the chip enable status, head selection and recording frequency are fed into the input of serial register 25 from controller 12. When information is to be written to the magnetic discs, controller 12 designates the mode of pre-amplifier circuit 16 as write mode and the control signals are sent to serial register 25, which ultimately enables write driver circuit 16W. When information is to be read from the magnetic discs, controller 12 designates the mode of pre-amplifier circuit 16 as read mode and sends the control signals to serial register 25, which ultimately enables read amplifier circuit 16R.

In the read mode, read head select and chip enable status information is input to serial register 25 at a specific location. Read head select information from register 25 is sent to multiplexer 36. Multiplexer 36 then selects one of the read heads from which data is read and sent to read amplifier circuit 16R. The data is amplified by read amplifier circuit 16R in conjunction with voltage gain control 26 and digital-to-analog converter 24 for eventual processing and forwarding to controller 12. In multiplexer 36 of FIG. 2, head select information from serial register 25 is utilized to enable one of the connection lines. Thus, if head 20b is to be selected, multiplexer 36 processes head select information to enable connection 23b. This allows head 20b to read from magnetic disc 22b.

When pre-amplifier circuit 16 is in read mode, control signals from channel ICs 14 relating to the read function are fed to serial register 25. Once a read head is selected, encoded data is received by that head from a corresponding disc. The encoded data is then input into read amplifier circuit 16R. The output of read amplifier circuit 16R is controlled by voltage gain control 26 which is controlled by digital-to-analog converter 24. Digital-to-analog converter 24 is controlled by serial register 25 which translates instructions received from controller 12 to control the gain of read amplifier circuit 16R so that the data is accurately transformed from the disc to the host computer. The output of read amplifier circuit 16R is then transmitted to the channel ICs.

In the write mode, serial register 25 receives data to be written, as well as write head select and chip enable status information, all serially. The data and information are received in serial register 25 so that each occupies designated locations therein. Write head select information is then sent to multiplexer 34. Multiplexer 34 then selects one of the write heads through which data is written onto a magnetic disc. Similar to multiplexer 36, multiplexer 34 processes head select information to enable one of the connection lines. Thus, if head 20b is to be selected, switching circuit 34 processes head select information to enable connection 23b. This allows head 20b to write data onto magnetic disc 22b.

When pre-amplifier circuit 16 is in a write mode, control signals relating to the write function are fed into the input of serial register 25 from channel ICs 14. Once a write head has been selected, serial register 25 passes instructions received from controller 12 regarding the write signal to digital-to-analog converter 28. Digital-to-analog converter 28 then translates the instructions so that the write data current is accurately established by current source 30. This allows the analog signals to be proper for recording on the magnetic discs. Encoded data are sent to write driver circuit, which outputs a write signal through multiplexer 34 to the selected magnetic head.

A pre-amplifier circuit made in accordance with the present invention is capable of more efficiently serving heads than the way they are currently serviced with conventional systems. Head selection information received from controller 12 is stored in serial register 25. Outputs of serial register 25 are connected to multiplexers 34 and 36, so that one head is selected from a plurality to write or read. In this way, pre-amplifier circuit 16 is able to service the same number of heads as are serviced with currently available conventional systems, while using fewer total pins.

Information regarding write or read, head selection and chip enable status is fed directly to register 25 from controller 12 without excessive chip space. Registers 25, digital-to-analog converter 24, digital-to-analog converter 28, read amplifier circuit 16R, write driver circuit 16W and multiplexers 34 and 36 can all be placed on one chip. Previous systems required off-chip circuitry with passive elements to function effectively.

Register 25 is "programmable" so that it may accommodate various head types. As each track of the magnetic disc is traversed during a write operation, individualized information pertaining to the specific track is retrieved from controller 12 and input to serial register 25. Register 25 outputs data to converter 28, current source 30, and multiplexer 34 to achieve a write function and selected head. Thus, head selection is performed at register 25 which is programmed with a specific data characteristics associated with the particular disc drive being used.

As each track of the magnetic disc is traversed during a read operation, individualized information pertaining to the specific track is retrieved from controller 12 and input to serial register 25. Serial register 25 and multiplexer 36 select an appropriate head. Thus, head selection is performed at serial register 25 which is programmed with specific data characteristics associated with the particular disc drive being used.

Pre-amplifier circuits made in accordance with the present invention contain circuitry which allows control information to be processed on-chip, without significantly increasing the size of the pre-amplifier circuit.

Although the present invention has been described with reference to preferred embodiments, workers skilled in the art will recognize that changes may be made in form and detail without departing from the spirit and scope of the invention.

What is claimed is:

1. In a data storage system having a plurality of magnetic transducing means for storing and retrieving data signals on a magnetic medium and a controller for issuing instructions, a pre-amplifier comprising:

a read amplifier having an adjustable gain;

a write driver having an adjustable current source;

a serial shift register responsive to instructions from the controller to selectively operate the read amplifier and the write driver and produce control, signals;

a first digital-to-analog converter connected to the read amplifier and responsive to a control signal from the serial shift register to adjust the gain of the read amplifier;

a second digital-to-analog converter connected to the write driver and responsive to a control signal from the serial shift register to adjust the current source of the write driver;

a multiplexer means responsive to a control signal from the serial shift register to select one of the plurality of magnetic transducers and to connect the selected magnetic transducer to the read amplifier; and a demultiplexer means responsive to a control signal from the serial shift register to select one of the plurality of magnetic transducers and to connect the selected magnetic transducer to the write driver.

2. The data storage system of claim 1 wherein the controller, the serial shift register, the write driver, the read amplifier, the first and second digital-to-analog converters, the multiplexer means and the demultiplexer means comprise a single integrated circuit.

3. In a data storage system including a magnetic disk, a plurality of read/write heads, a controller for issuing instructions, and a pre-amplifier having a read amplifier and a write driver, the read amplifier having an adjustable gain and the write driver having an adjustable current source, the improvement comprising:

a serial shift register responsive to instructions from the controller to selectively operate the read amplifier and the write driver and to produce control signals;

a first digital-to-analog converter connected to the read amplifier and responsive to a control signal to control the gain of the read amplifier;

a second digital-to-analog converter connected to the serial shift register and responsive to a control signal to control the current source of the write driver;

a multiplexer means responsive to a control signal from the serial shift register to select one of the plurality of read/write heads and to connect the selected read/write head to the read amplifier; and a demultiplexer means responsive to a control signal from the serial shift register to select one of the plurality of read/write heads and to connect the selected read/write head to the write driver.

* * * * *

UNITED STATES PATENT AND TRADEMARK OFFICE
CERTIFICATE OF CORRECTION

PATENT NO. : 5,488,518
DATED : January 30, 1996
INVENTOR(S) : JOHN S. SHIER

It is certified that error appears in the above-indentified patent and that said Letters Patent is hereby corrected as shown below:

Col. 3, line 6, delete "19a-14 19d", insert --19a-19d

Col. 4, line 8, delete "25,", insert --25--

Signed and Sealed this

Fourth Day of June, 1996

Attest:

BRUCE LEHMAN

Attesting Officer      Commissioner of Patents and Trademarks